(12) United States Patent
Ikezawa et al.

(10) Patent No.: US 11,648,937 B2
(45) Date of Patent: May 16, 2023

(54) DRIVER ASSISTANCE DEVICE

(71) Applicant: Toyota Jidosha Kabushiki Kaisha, Toyota-shi Aichi-ken (JP)

(72) Inventors: Yuta Ikezawa, Susono (JP); Kohei Tochigi, Shizuoka-ken (JP); Shogo Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 17/104,252

(22) Filed: Nov. 25, 2020

(65) Prior Publication Data
US 2021/0162992 A1  Jun. 3, 2021

(30) Foreign Application Priority Data
Nov. 28, 2019 (JP) .............................. JP2019-215397

(51) Int. Cl.
*B60W 30/09* (2012.01)
*B60W 50/14* (2020.01)
(Continued)

(52) U.S. Cl.
CPC ........ *B60W 30/09* (2013.01); *B60W 30/0956* (2013.01); *B60W 30/18154* (2013.01); *B60W 40/04* (2013.01); *B60W 50/14* (2013.01); B60W 10/04 (2013.01); B60W 10/18 (2013.01); B60W 10/20 (2013.01); B60W 30/16 (2013.01); B60W 2554/4042 (2020.02); B60W 2555/60 (2020.02)

(58) Field of Classification Search
CPC ............. B60W 30/09; B60W 30/0956; B60W 30/18154; B60W 40/04; B60W 50/14; B60W 10/18; B60W 2554/4042; B60W 2555/60; B60W 2554/20
See application file for complete search history.

(56) References Cited

U.S. PATENT DOCUMENTS 10,366,286 B2 * 7/2019 Glickman .............. H04N 7/188
11,257,367 B2 * 2/2022 Cao ...................... G08G 1/0112
(Continued)

FOREIGN PATENT DOCUMENTS

JP          H1148827 A    2/1999
JP          2007-008298 A  1/2007
(Continued)

*Primary Examiner* — Peter D Nolan
*Assistant Examiner* — Anwar Mohamed
(74) *Attorney, Agent, or Firm* — Dinsmore & Shohl LLP

(57) ABSTRACT

A driver assistance device is configured to determine whether a type of a deceleration target is included in a category of a position-fixed object or a moving object, and determine whether the deceleration target is lost, and to continue the deceleration assistance on assumption that the lost deceleration target exists when the deceleration target is determined to be lost. The driver assistance device is configured to notify a driver of a host vehicle that the deceleration target is lost when the deceleration target is determined to be lost and the type of the deceleration target is included in the category of the moving object, and not to notify the driver that the deceleration target is lost when the deceleration target is determined to be lost and the type of the deceleration target is included in the category of the position-fixed object.

6 Claims, 6 Drawing Sheets

(51) Int. Cl.
  *B60W 30/095*  (2012.01)
  *B60W 40/04*  (2006.01)
  *B60W 30/18*  (2012.01)
  *B60W 10/04*  (2006.01)
  *B60W 10/20*  (2006.01)
  *B60W 10/16*  (2020.01)
  *B60W 10/18*  (2012.01)

(56) References Cited

U.S. PATENT DOCUMENTS

| | | | |
|---|---|---|---|
| 2007/0005218 A1 | 1/2007 | Ueyama | |
| 2012/0109421 A1* | 5/2012 | Scarola | G08G 1/22 |
| | | | 701/2 |
| 2019/0031163 A1* | 1/2019 | Adachi | B60W 50/0097 |
| 2019/0263378 A1* | 8/2019 | Adachi | B60W 10/18 |
| 2021/0139020 A1* | 5/2021 | Ikezawa | B60W 30/0956 |
| 2021/0300401 A1* | 9/2021 | Hashimoto | G08G 1/166 |
| 2022/0032883 A1* | 2/2022 | Ito | B60W 50/082 |

FOREIGN PATENT DOCUMENTS

| | | |
|---|---|---|
| JP | 2019-093882 A | 6/2019 |
| JP | 2019-149131 A | 9/2019 |

\* cited by examiner

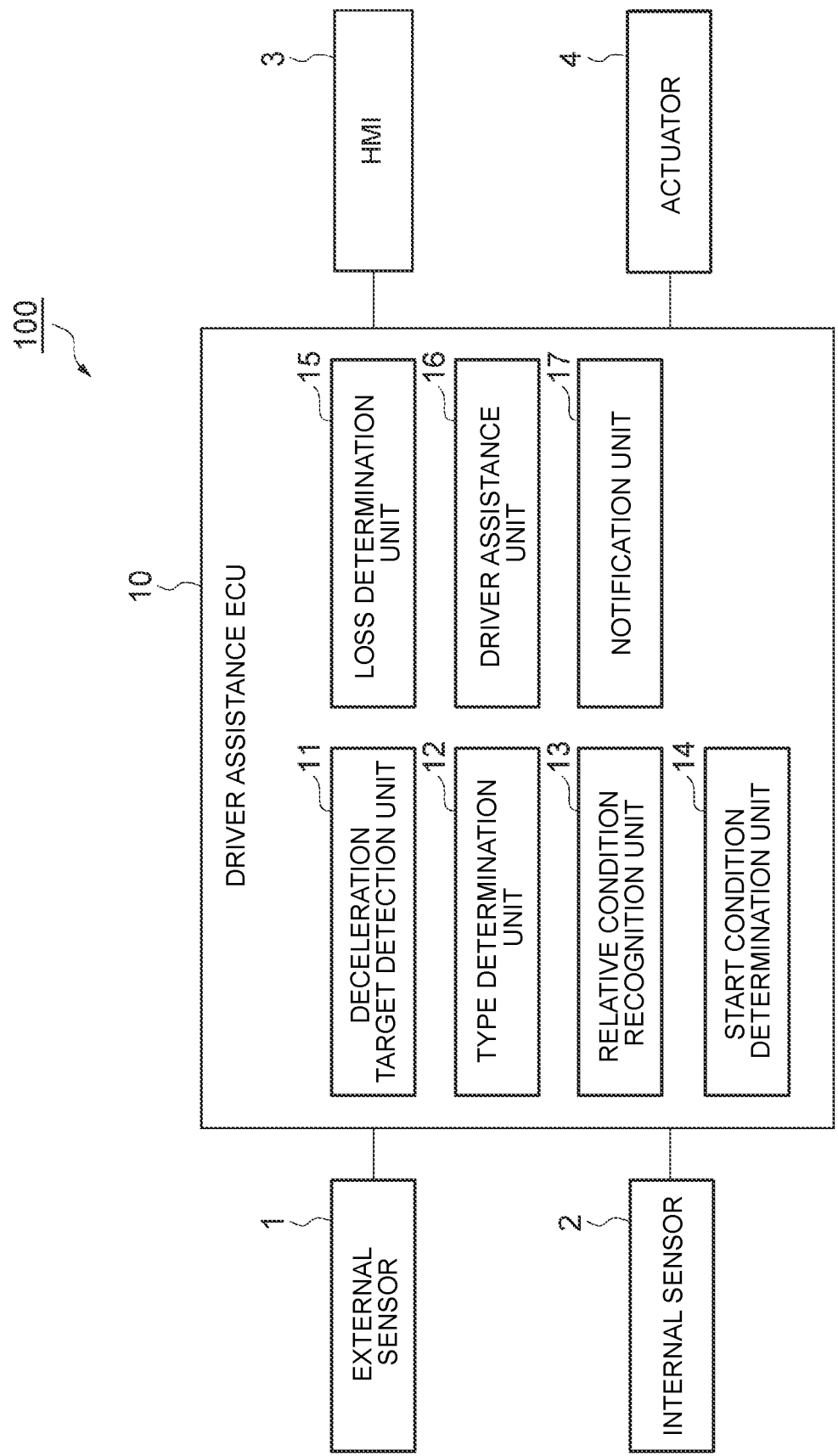

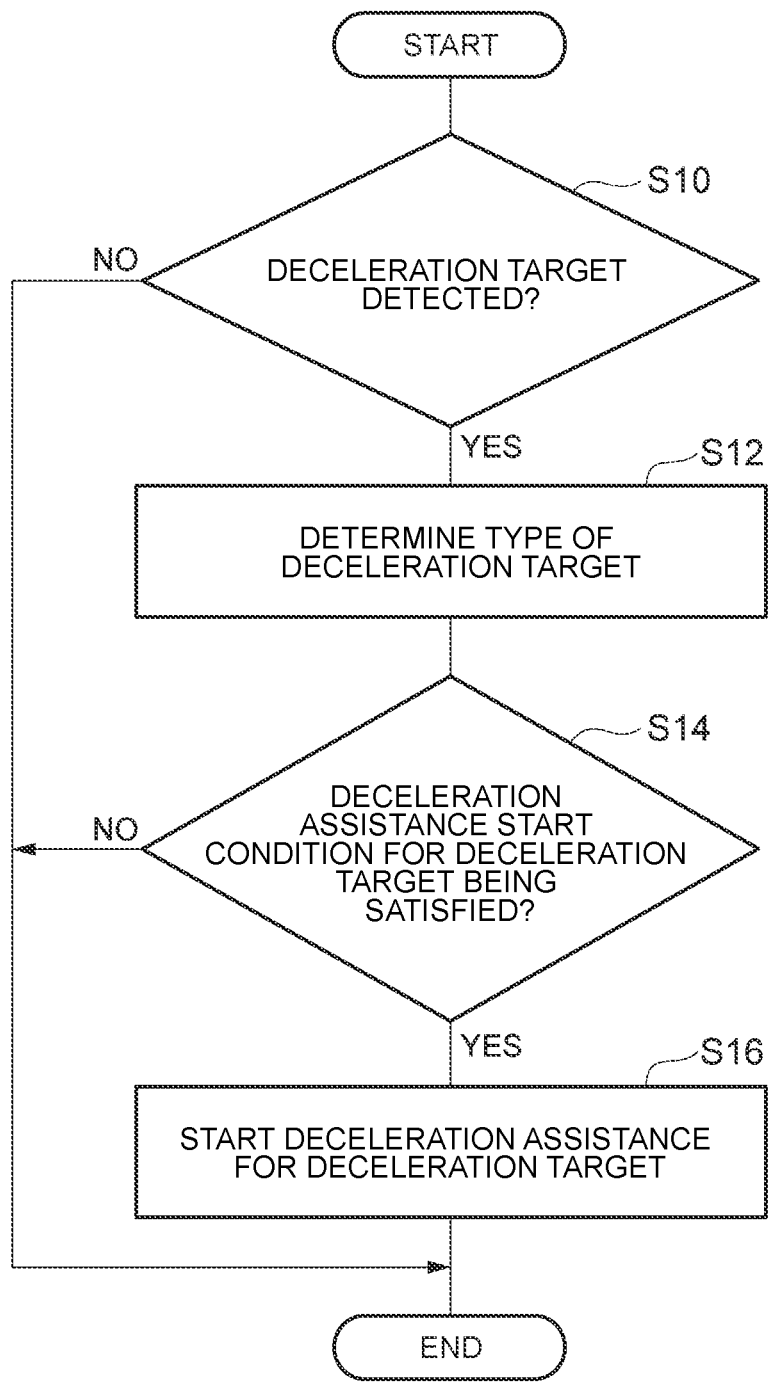

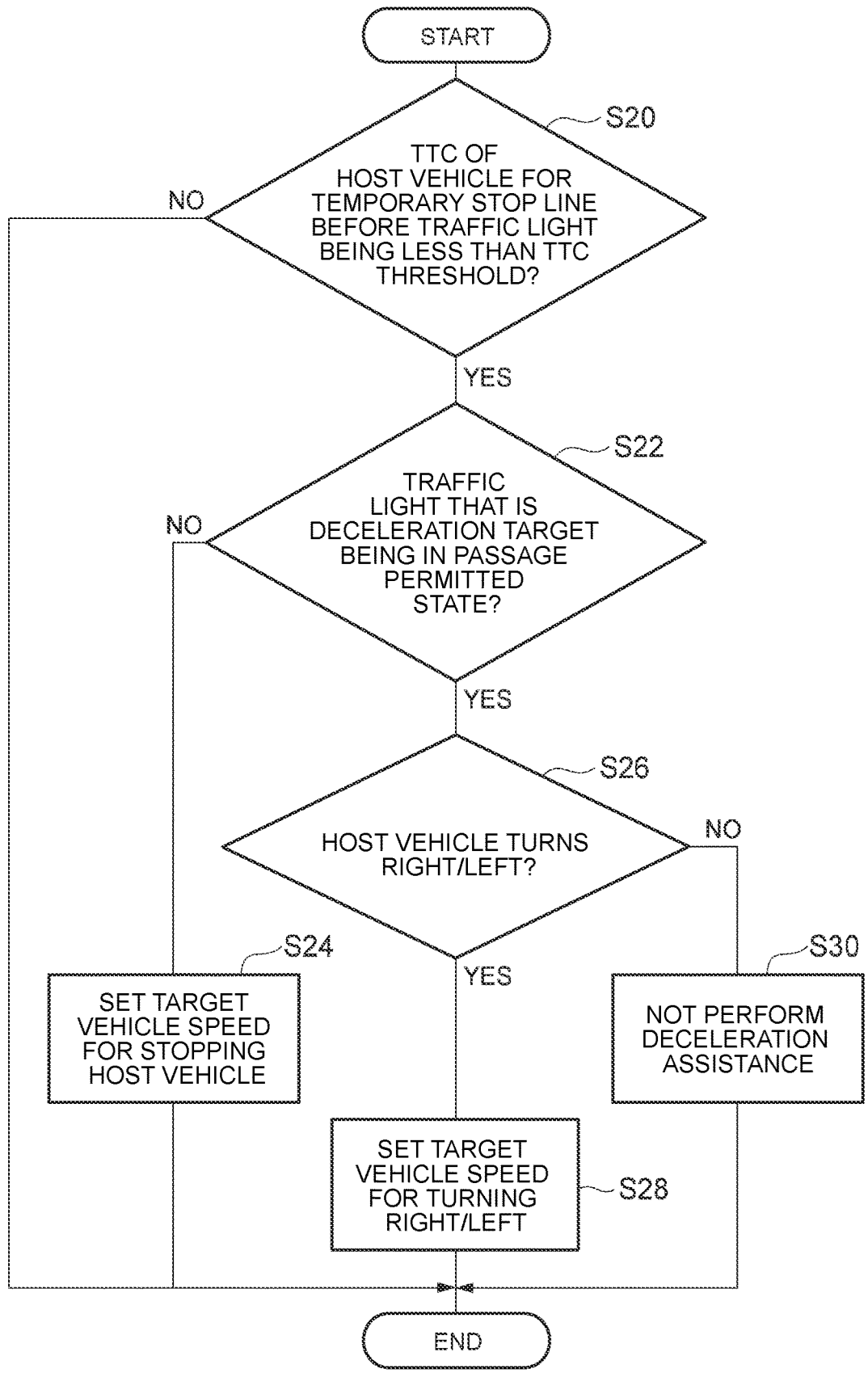

DRIVER ASSISTANCE DEVICE

CROSS-REFERENCE TO RELATED APPLICATION

This application claims priority to Japanese Patent No. 2019-215397 filed on Nov. 28, 2019, incorporated herein by reference in its entirety.

BACKGROUND

1. Technical Field

The disclosure relates to a driver assistance device.

2. Description of Related Art

Japanese Unexamined Patent Application Publication No. 2019-093882 (JP 2019-093882 A) is known as a technical document relating to a driver assistance device. This publication discloses that, in a driver assistance device that causes a host vehicle to transition to a temporary stop mode to stop the host vehicle when the host vehicle enters a predetermined section from a temporary stop position, a warning is issued to notify a driver before the temporary stop mode ends.

SUMMARY

Deceleration assistance is known in which the host vehicle is decelerated under a predetermined condition so as to avoid approaching by the host vehicle to a deceleration target, such as a preceding vehicle and a temporary stop line, while maintaining a high vehicle speed. The deceleration target may be lost due to various factors while the deceleration assistance is being performed, and it is considered to continue the deceleration assistance on assumption that the deceleration target exists even when the deceleration target is lost. When continuing the deceleration assistance as described above, there may be a case where the driver who receives the notification does not need to perform any operation depending on the situation. If the driver is uniformly notified that the deceleration target is lost, regardless that the situation above may occur, the driver may feel annoyed by the notification.

A first aspect of the disclosure is a driver assistance device that is configured to perform, when a deceleration target is detected in front of a host vehicle, deceleration assistance of the host vehicle for the deceleration target. The driver assistance device includes a type determination unit configured to determine whether a type of the deceleration target is included in a category of a position-fixed object or a category of a moving object; a loss determination unit configured to determine whether the deceleration target is lost while the deceleration assistance is being performed; a driver assistance unit configured to continue the deceleration assistance on assumption that the lost deceleration target exists when the loss determination unit determines that the deceleration target is lost; and a notification unit. The notification unit is configured to notify a driver of the host vehicle that the deceleration target is lost, when the loss determination unit determines that the deceleration target is lost and the type of the deceleration target is included in the category of the moving object, and not notify the driver that the deceleration target is lost, when the loss determination unit determines that the deceleration target is lost and the type of the deceleration target is included in the category of the position-fixed object.

According to the first aspect, when the type of the lost deceleration target is included in the category of the position-fixed object, the driver is not notified that the deceleration target is lost. Therefore, under the condition that it is not necessary to cause the driver to intervene the driving operation and it is highly likely to recognize the deceleration target again promptly even when the deceleration target is lost, issuance of unnecessary notification to the driver can be avoided, which can suppress causing the driver to feel annoyed by the notification that the deceleration target is lost.

In the first aspect, the driver assistance unit may be configured to continue the deceleration assistance by using a position of the deceleration target when the loss determination unit determines that the deceleration target is lost and the type of the deceleration target is included in the category of the position-fixed object. The position of the deceleration target may be a position when the deceleration target is lost.

With the configuration above, when the type of deceleration target is included in the category of the position-fixed object, the position of the lost deceleration target is not changed. Therefore, appropriate deceleration assistance can be continued using the position of the deceleration target when the deceleration target is lost.

In the first aspect, the type determination unit may be configured to determine whether the deceleration target is a traffic light and determine a lighting state of the traffic light when the deceleration target is the traffic light. The notification unit may be configured to: determine whether a target vehicle speed of the deceleration assistance is changed to a small value by the lighting state of the traffic light changed from the lighting state at time that the traffic light is lost, when the type determination unit determines that the deceleration target is the traffic light and the loss determination unit determines that the traffic light is lost; notify the driver that the traffic light is lost, when the change in the lighting state of the traffic light causes the target vehicle speed of the deceleration assistance to be changed to a small value; and not notify the driver that the traffic light is lost, when the change in the lighting state of the traffic light does not cause the target vehicle speed of the deceleration assistance to be changed to a small value.

With the configuration above, when the target vehicle speed of the deceleration assistance is changed to a small value due to a change in the lighting state of the traffic light, which is the deceleration target, after the traffic light is lost, there is a possibility that the host vehicle may need further deceleration from the current deceleration assistance due to the change in the lighting state of the traffic light. Accordingly, by notifying the driver that the traffic light is lost, the driver can be prompted to perform a deceleration operation of the host vehicle at the driver's discretion.

A second aspect of the disclosure is a driver assistance device including an electronic control unit. The electronic control unit is configured to perform, when a deceleration target is detected in front of a host vehicle, a deceleration assistance of the host vehicle for the deceleration target, determine whether a type of the deceleration target is included in a category of a position-fixed object or a category of a moving object, determine whether the deceleration target is lost while the deceleration assistance is being performed, and continue the deceleration assistance on assumption that the lost deceleration target exists when the deceleration target is determined to be lost. The electronic control unit is configured to notify a driver of the host vehicle that the deceleration target is lost, when the deceleration target is determined to be lost and the type of the deceleration target is included in the category of the moving object. The electronic control unit is configured to not notify the driver that the deceleration target is lost, when the deceleration target is determined to be lost and the type of the deceleration target is included in the category of the position-fixed object.

In the second aspect, the electronic control unit may be configured to continue the deceleration assistance by using a position of the deceleration target, when the deceleration target is determined to be lost and the type of the deceleration target is included in the category of the position-fixed object. The position of the deceleration target may be a position when the deceleration target is lost.

In the second aspect, the electronic control unit may be configured to: determine whether the deceleration target is a traffic light and determine a lighting state of the traffic light when the deceleration target is the traffic light; determine whether a target vehicle speed of the deceleration assistance is changed to a small value by the lighting state of the traffic light changed from the lighting state at time that the traffic light is lost, when the deceleration target is determined to be the traffic light and the traffic light is determined to be lost; notify the driver that the traffic light is lost, when the change in the lighting state of the traffic light causes the target vehicle speed of the deceleration assistance to be changed to a small value; and not notify the driver that the traffic light is lost, when the change in the lighting state of the traffic light does not cause the target vehicle speed of the deceleration assistance to be changed to a small value.

According to the first and second aspects of the disclosure, it is possible to suppress causing the driver to feel annoyed by the notification that the deceleration target is lost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing an example of a driver assistance device according to an embodiment;

FIG. 3 is a flowchart showing an example of deceleration assistance start processing;

FIG. 4 is a flowchart showing an example of determination processing of a deceleration assistance start condition when the deceleration target is the traffic light;

DETAILED DESCRIPTION OF EMBODIMENTS

Figure 2A:
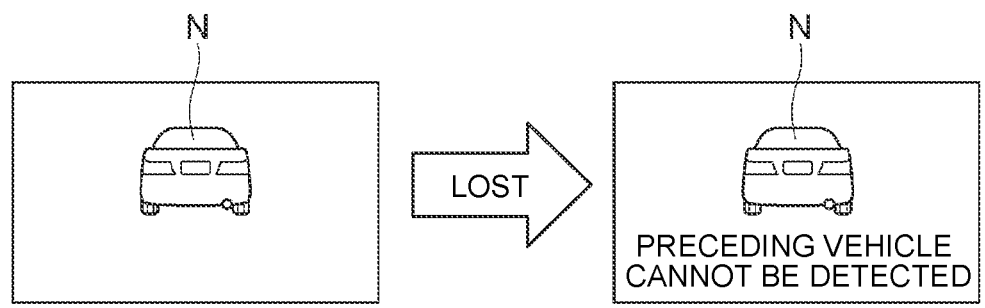
FIG. 2A includes diagrams for explaining images displayed before and after a deceleration target is lost when the deceleration target is a preceding vehicle.

Hereinafter, an embodiment of the disclosure will be described with reference to the drawings.

A driver assistance device 100 shown in FIG. 1 is a device that is mounted on a vehicle (host vehicle) such as a passenger car and assists a driver in driving of the host vehicle. The driver assistance device 100 provides deceleration assistance of the host vehicle under a predetermined condition when a deceleration target such as a preceding vehicle or a traffic light is detected in front of the host vehicle. The deceleration target is a target for the deceleration assistance. The deceleration target includes a preceding vehicle, traffic lights, and temporary stop lines. The deceleration target may include pedestrians and bicycles, etc. in addition to the preceding vehicle, and may include curves, pedestrian crossings, fallen objects, construction installations, and structures, etc. in addition to traffic lights and temporary stop lines.

The deceleration assistance is driver assistance for decelerating the host vehicle to a preset target vehicle speed. The target vehicle speed is not particularly limited, and may be 0 km/h or may be 10 km/h. The target vehicle speed may be determined in accordance with the type of deceleration target. When the deceleration target is a traffic light, the target vehicle speed of the deceleration assistance may be changed in accordance with a lighting state of the traffic light (the lighting state such as a green signal, a yellow signal, and a red signal). When the deceleration target is a moving object such as a preceding vehicle, the target vehicle speed is not limited to the speed of the host vehicle, and may be a relative speed between the host vehicle and the deceleration target.

Configuration of Driver Assistance Device

A configuration of the driver assistance device 100 according to the embodiment will be described with reference to the drawings. As shown in FIG. 1, the driver assistance device 100 includes a driver assistance electronic control unit (ECU) 10 that comprehensively controls the device. The driver assistance ECU 10 is an electronic control unit including a central processing unit (CPU), a read only memory (ROM), a random access memory (RAM), and the like. For example, the driver assistance ECU 10 loads a program stored in the ROM into the RAM and causes the CPU to execute the program loaded in the RAM so as to realize various functions. The driver assistance ECU 10 may be composed of a plurality of electronic units.

The driver assistance ECU 10 is connected to an external sensor 1, an internal sensor 2, a human machine interface (HMI) 3, and an actuator 4.

The external sensor 1 is a detection device that detects a condition around the host vehicle. The external sensor 1 includes at least one of a camera and a radar sensor. The camera is an imaging device that captures images of an external condition of the host vehicle. The camera is provided, for example, on a back side of a windshield of the host vehicle and captures images forward of the host vehicle. The camera transmits imaging information regarding the external condition of the host vehicle to the driver assistance ECU 10. The camera may be a monocular camera or a stereo camera.

The radar sensor is a detection device that detects an object around the host vehicle using radio waves (e.g. millimeter waves) or light. The radar sensor includes, for example, a millimeter wave radar or a light detection and ranging (LIDAR) sensor. The radar sensor detects the object by transmitting radio waves or light to the vicinity of the host vehicle and receiving the radio waves or the light reflected by the object. The radar sensor transmits the detected object information to the driver assistance ECU 10. The object includes fixed obstacles such as guardrails and buildings, as well as moving obstacles such as pedestrians, bicycles, and other vehicles.

The internal sensor 2 is a detection device that detects a traveling state of the host vehicle. The internal sensor 2 includes a vehicle speed sensor, an acceleration sensor, and a yaw rate sensor. The vehicle speed sensor is a detection device that detects the speed of the host vehicle. A wheel speed sensor may be used as the vehicle speed sensor. The wheel speed sensor is provided for, for example, wheels of the host vehicle or a drive shaft that rotates integrally with the wheels, and detects a rotational speed of each wheel. The vehicle speed sensor transmits the detected vehicle speed information (wheel speed information) to the driver assistance ECU 10.

The acceleration sensor is a detection device that detects an acceleration of the host vehicle. The acceleration sensor includes, for example, a longitudinal acceleration sensor that detects a longitudinal acceleration of the host vehicle and a lateral acceleration sensor that detects a lateral acceleration of the host vehicle. The acceleration sensor transmits, for example, acceleration information of the host vehicle to the driver assistance ECU 10. The yaw rate sensor is a detection device that detects a yaw rate (rotational angular velocity) about a vertical axis of the center of gravity of the host vehicle. A gyro sensor, for example, may be used as the yaw rate sensor. The yaw rate sensor transmits the detected yaw rate information of the host vehicle to the driver assistance ECU 10.

The HMI 3 is an interface for inputting and outputting information between the driver assistance device 100 and the driver. The HMI 3 includes, for example, a display and a speaker. The HMI 3 outputs an image on a display and outputs a voice from a speaker in accordance with a control signal from the driver assistance ECU 10. The display may be a head-up display (HUD).

An actuator 4 is a device used to control the host vehicle. The actuator 4 includes at least a drive actuator and a brake actuator. The actuator 4 may include a steering actuator. The drive actuator controls a drive force of the host vehicle by controlling an amount of air to be supplied to an engine (throttle opening) in response to a control signal from the driver assistance ECU 10. When the host vehicle is a hybrid vehicle, a control signal from the driver assistance ECU 10 is input to a motor as a power source in addition to the amount of air supplied to the engine so as to control the drive force. When the host vehicle is an electric vehicle, a control signal from the driver assistance ECU 10 is input to a motor as a power source so as to control the drive force. The motor as the power source in the cases above constitutes the actuator 4.

The brake actuator controls a brake system in accordance with a control signal from the driver assistance ECU 10 and controls a braking force to be applied to the wheels of the host vehicle. As the brake system, for example, a hydraulic brake system may be used. The steering actuator controls driving of an assist motor that controls steering torque in an electric power steering system in accordance with a control signal from the driver assistance ECU 10. As a result, the steering actuator controls the steering torque of the host vehicle.

Next, a functional configuration of the driver assistance ECU 10 will be described. As shown in FIG. 1, the driver assistance ECU 10 includes a deceleration target detection unit 11, a type determination unit 12, a relative condition recognition unit 13, a start condition determination unit 14, a loss determination unit 15, a driver assistance unit 16, and a notification unit 17. Note that some of the functions of the driver assistance ECU 10 described below may be executed in a server that can communicate with the host vehicle.

The deceleration target detection unit 11 detects the deceleration target in front of the host vehicle based on the detection result of the external sensor 1. The deceleration target detection unit 11 detects the deceleration target based on images captured by the camera or object information of the radar sensor.

The type determination unit 12 determines a type of the deceleration target based on the detection result of the external sensor 1. The type determination unit 12 determines whether the type of deceleration target is included in a category of a position-fixed object or a category of a moving object. The position-fixed object means an object having a position that is fixed with respect to the road. Specifically, the position-fixed object includes the traffic lights and the temporary stop lines. The position-fixed object may include a part of the road or a curve. The position-fixed object may include structures such as pedestrian crossings, construction installations, fallen objects, and guardrails. The moving object means an object that is movable on the road. The moving object includes a preceding vehicle that is traveling or is stopped. The moving object may include bicycles and pedestrians.

The type determination unit 12 performs pattern matching using an image pattern for each type stored in advance based on, for example, the image in front of the host vehicle that is captured by the camera such that the type determination unit 12 determines whether the type of the deceleration target is included in the category of the position-fixed object or the category of the moving object, by recognizing the type of the deceleration target, such as the traffic light, the temporary stop line, or the preceding vehicle. Further, when the deceleration target is the traffic light, the type determination unit 12 determines a lighting state of the traffic light by performing a related image processing technique.

The type determination unit 12 may determine the type of deceleration target based on the object information of the radar sensor. The type determination unit 12 may be a part of the deceleration target detection unit 11. In this case, the deceleration target detection unit 11 performs both detection of the deceleration target and determination of the type of the deceleration target.

The relative condition recognition unit 13 recognizes a relative condition between the host vehicle and the deceleration target. The relative condition includes at least the distance between the host vehicle and the deceleration target (a distance in a front-rear direction or a traveling direction of the host vehicle). The relative condition may include the relative speed between the host vehicle and the deceleration target.

The relative condition recognition unit 13 recognizes the relative condition between the host vehicle and the deceleration target based on the detection result of the external sensor 1, for example. When the deceleration target is a vehicle that is capable of inter-vehicle communication with the host vehicle, the relative condition recognition unit 13 may recognize the relative condition between the host vehicle and the deceleration target using information acquired by the inter-vehicle communication. The relative condition recognition unit 13 may recognize the relative speed between the host vehicle and the deceleration target based on, for example, the speed of the deceleration target acquired by inter-vehicle communication and the speed of the host vehicle. The relative condition recognition unit 13 may use the detection result of the internal sensor 2 (the detection result of the vehicle speed sensor) to recognize the relative speed between the host vehicle and the deceleration target.

The start condition determination unit 14 determines whether a deceleration assistance start condition for the deceleration target is satisfied. The deceleration assistance start condition is a condition that is preset for use in a determination of the start of the deceleration assistance. The start condition determination unit 14 determines whether the deceleration assistance start condition is satisfied based on at least the distance between the host vehicle and the deceleration target.

The deceleration assistance start condition is changed in accordance with the type of deceleration target. For example, when the type of deceleration target is the preceding vehicle, the start condition determination unit 14 determines whether the deceleration assistance start condition for the preceding vehicle is satisfied based on the relative condition between the host vehicle and the deceleration target.

Specifically, the start condition determination unit 14 determines that the deceleration assistance start condition for the preceding vehicle is satisfied when the speed of the host vehicle is higher than the speed of the preceding vehicle (a positive value in a direction in which the relative speed approaches), and a time to collision (TTC) between the host vehicle and the preceding vehicle is less than a TTC threshold. The TTC is obtained by dividing the distance between the host vehicle and the deceleration target (preceding vehicle) by the relative speed (approach speed) between the host vehicle and the deceleration target. The TTC threshold is a threshold having a preset value. Hereinafter, the threshold used in the description means a threshold having a preset value.

When a time headway (THW) obtained by dividing the distance between the host vehicle and the preceding vehicle by the speed of the host vehicle is less than a THW threshold, instead of the TTC, the start condition determination unit 14 may determine that the deceleration assistance start condition for the preceding vehicle is satisfied. When the distance between the host vehicle and the preceding vehicle is less than a distance threshold, instead of TTC, the start condition determination unit 14 may determine that the deceleration assistance start condition for the preceding vehicle is satisfied.

The start condition determination unit 14 may determine that the deceleration assistance start condition for the preceding vehicle is satisfied when the speed of the host vehicle is higher than the speed of the preceding vehicle and a required deceleration of the host vehicle is equal to or larger than the deceleration threshold. The required deceleration may be, for example, a deceleration required to avoid that the distance between the host vehicle and the preceding vehicle falls below a threshold that is predetermined for each speed. The required deceleration may be a deceleration required to avoid that the distance between the host vehicle and the preceding vehicle falls below a certain value.

When the type of deceleration target is a temporary stop line, the start condition determination unit 14 determines whether the deceleration assistance start condition for the temporary stop line is satisfied based on the speed of the host vehicle detected by the internal sensor 2 (vehicle speed sensor) and the relative condition between the host vehicle and the temporary stop line.

Specifically, when the speed of the host vehicle is equal to or higher than an assistance start speed threshold, and the TTC between the host vehicle and the temporary stop line is less than the TTC threshold, the start condition determination unit 14 determines that the deceleration assistance start condition for the temporary stop line is satisfied. The TTC in this case corresponds to an arrival time of the host vehicle at the temporary stop line. When the distance between the host vehicle and the temporary stop line is less than the distance threshold, instead of TTC, the start condition determination unit 14 may determine that the deceleration assistance start condition for the preceding vehicle is satisfied.

Further, when the speed of the host vehicle is equal to or higher than the assistance start speed threshold, and the required deceleration is equal to or larger than the deceleration threshold, the start condition determination unit 14 may determine that the deceleration assistance start condition for the temporary stop line is satisfied. The required deceleration in this case is, for example, the deceleration required for the host vehicle to stop at the position of the temporary stop line. Note that the TTC threshold, the distance threshold, and the deceleration threshold may be different values depending on the type of deceleration target.

When the type of deceleration target is the traffic light, the start condition determination unit 14 makes a determination of the deceleration assistance start condition for the temporary stop line before the traffic light as a target. Here, when the type of deceleration target is the traffic light, and the start condition determination unit 14 cannot detect the temporary stop line before the traffic light by the external sensor 1 due to, for example, a faded road marking line indicating the temporary stop line, the start condition determination unit 14 makes the determination of the deceleration assistance start condition on assumption that the temporary stop line exists at a position a certain distance before the traffic light. The determination of the deceleration assistance start condition for the temporary stop line can be applied when the type of deceleration target is included in the category of the position-fixed object.

When the type of deceleration target is the traffic light, the start condition determination unit 14 may make the determination of the deceleration assistance start condition based on the lighting state of the traffic light when the host vehicle approaches the traffic light. The time when the host vehicle approaches the traffic light is, for example, when the TTC of the host vehicle at the position of the temporary stop line before the traffic light or at the position a certain distance before the traffic light falls below the TTC threshold. The THW may be used instead of TTC, and the distance between the host vehicle and the position of the temporary stop line (or the position a certain distance before the traffic light) may be used.

When the host vehicle approaches the traffic light, the start condition determination unit 14 determines whether the traffic light is in a passage permitted state based on the detection result of the external sensor 1 (e.g. the image captured by the camera). Here, the passage permitted state means a state where the host vehicle is permitted to pass in a traveling direction of a traveling lane in which the host vehicle is traveling. The traveling direction of the traveling lane in which the host vehicle is traveling can be recognized through image recognition of an arrow shown on the road surface of the traveling lane (arrow painted on a road surface) or image recognition of a sign indicating the traveling direction of the traveling lane. The traveling direction of the traveling lane in which the host vehicle is traveling may be recognized from the position of the host vehicle and map information (map information including information on the traveling direction for each lane).

For example, when the traffic light is a traffic light with a left turn arrow and the traveling lane in which the host vehicle is traveling is a lane dedicated to left turn, the start condition determination unit 14 determines that the host vehicle is in the passage permitted state when the left turn arrow is lit. When the traveling lane in which the host vehicle is traveling is a lane dedicated to straight traveling, the start condition determination unit 14 does not determine that the vehicle is in the passage permitted state even when the left-turn arrow is lit. When the traveling lane in which the host vehicle is traveling is the lane dedicated to straight traveling, the start condition determination unit 14 determines that the host vehicle is in the passage permitted state when the traffic light is green or when the straight arrow of the traffic light is lit.

When the start condition determination unit 14 fails to recognize the traveling direction of the traveling lane in which the host vehicle is traveling, the start condition determination unit 14 determines whether the traffic light is in the passage permitted state based on the lighting state of the traffic light. In this case, the start condition determination unit 14 may determine that the traffic light is in the passage permitted state when the lighting state of the traffic light is green. Hereinafter, a state in which the traffic light prohibits passage of the host vehicle for the lane in which the host vehicle is currently traveling is referred to as a passage prohibited state, and a state in the middle of transition from the passage permitted state to the passage prohibited state is referred to as a transition state. An example of the passage prohibited state is a red signal. An example of the transition state is a yellow signal.

When the start condition determination unit 14 determines that the traffic light is not in the passage permitted state (when the traffic light is in the passage prohibited state or in the transition state), the start condition determination unit 14 determines that the deceleration assistance start condition is satisfied.

When the start condition determination unit 14 determines that the traffic light is in the passage permitted state, the start condition determination unit 14 determines whether the host vehicle turns right/left or not. The start condition determination unit 14 determines whether the host vehicle turns right/left or not, for example, based on the traveling direction of the traveling lane in which the host vehicle is traveling. The start condition determination unit 14 determines that the host vehicle turns right or left when the traveling lane is the lane dedicated to right turn or the lane dedicated to left turn. The start condition determination unit 14 may determine whether the host vehicle turns right/left or not based on the lighting state of a turn indicator of the host vehicle.

The start condition determination unit 14 determines that the deceleration assistance start condition is satisfied when the start condition determination unit 14 determines that the traffic light is in the passage permitted state and the host vehicle turns right or left. The start condition determination unit 14 determines that the deceleration assistance start condition is not satisfied when the start condition determination unit 14 determines that the traffic light is in the passage permitted state and determines that the host vehicle does not turn right or left (travels straight).

The loss determination unit 15 determines whether the deceleration target is lost while the deceleration assistance is being performed. The loss determination unit 15 makes a loss determination based on the detection result of the external sensor 1. The phrase "the deceleration target is lost" means that the external sensor 1 cannot detect the deceleration target. The deceleration target is lost when, for example, the deceleration target is deviated from a detection range of the external sensor 1 (an image capturing range of the camera or a detection range of the radar sensor) due to a curve, etc., when the deceleration target is hidden by an adjacent vehicle, or when a sensor abnormality occurs.

When the start condition determination unit 14 determines that the deceleration assistance start condition is satisfied, the driver assistance unit 16 starts the deceleration assistance as driver assistance of the host vehicle. The driver assistance unit 16 performs the deceleration assistance of the host vehicle by transmitting a control signal to the actuator 4. The driver assistance unit 16 performs the deceleration assistance such that the host vehicle is decelerated to reach the preset target speed based on the distance between the host vehicle and the deceleration target and the speed of the host vehicle.

The driver assistance unit 16 performs the deceleration assistance using the target vehicle speed that is preset in accordance with the type of the deceleration target. When the type of deceleration target is the traffic light, the driver assistance unit 16 changes the target vehicle speed of the deceleration assistance in accordance with the state of the traffic light. The driver assistance unit 16 sets the target vehicle speed of the deceleration assistance as the target vehicle speed for stopping the host vehicle (for example, 0 km/h) when the traffic light is in the passage prohibited state. The target vehicle speed for stopping the host vehicle does not necessarily have to be 0 km/h, and may be a speed near 0 km/h.

When the traffic light is in the passage permitted state, and deceleration assistance corresponding to the right or left turn of the host vehicle is performed, the driver assistance unit 16 may set the target vehicle speed for deceleration assistance as the target vehicle speed for turning right or left (for example, 30 km/h). The target vehicle speed for turning right or left is not particularly limited as long as the target vehicle speed is other than 0 km/h. The target vehicle speed for turning right or left may be, for example, 30 km/h. As a result, even when the traffic light is in the passage permitted state, deceleration assistance is performed such that the vehicle speed is equal to or lower than a certain speed when the host vehicle turns right or left, thereby suppressing that the host vehicle starts turning right or left while maintaining high vehicle speed.

When the loss determination unit 15 determines that the deceleration target is lost, the driver assistance unit 16 continues deceleration assistance on assumption that the lost deceleration target exists. When the type of deceleration target is included in the category of the position-fixed object, the driver assistance unit 16 continues the deceleration assistance using the position of the deceleration target when the deceleration target is lost. When the type of deceleration target is included in the category of the position-fixed object, the position of the deceleration target with respect to the road is not changed. Therefore, the driver assistance unit 16 can continue the deceleration assistance that has been performed before the deceleration target is lost by recognizing the relative condition based on an effect by driving of the host vehicle using the position of the deceleration target when the deceleration target is lost.

Even when the type of deceleration target is included in the category of the moving object, the driver assistance unit 16 continues the deceleration assistance on assumption that the lost deceleration target exists. The driver assistance unit 16 continues the deceleration assistance by, for example, maintaining the deceleration used in the deceleration assistance when the deceleration target is lost. The driver assistance unit 16 may continue the deceleration assistance on assumption that the deceleration target maintains the speed and the traveling direction when the deceleration target is lost. At this time, the driver assistance unit 16 may continue the deceleration assistance with modifying an absolute value of the deceleration to have a small value compared to that before the deceleration target is lost. A jerk at the time of deceleration may be corrected to a small value instead of the absolute value of the deceleration.

The notification unit 17 notifies the driver of the host vehicle about driver assistance. The notification unit 17 transmits a control signal to the HMI 3 to issue a notification including at least one of image output by the display and audio output by the speaker. The notification unit 17 may issue a deceleration assistance start notification when the start condition determination unit 14 determines that the deceleration assistance start condition is satisfied. The deceleration assistance start notification is a notification for notifying the driver that the deceleration assistance is started. The contents of the deceleration assistance start notification are not particularly limited.

When the loss determination unit 15 determines that the deceleration target is lost, the notification unit 17 notifies the driver that the deceleration target is lost when the type of the deceleration target is included in the category of the moving object. The notification that the deceleration target is lost may be made by displaying an image on the display, or may be made by voice output from the speaker.

Here, FIG. 2A includes diagrams for explaining images displayed before and after the decelerating target is lost when the deceleration target is a preceding vehicle. FIG. 2A shows images N of the preceding vehicle. In FIG. 2A, the diagram on the left shows the image displayed before the deceleration target is lost, and the diagram on the right indicates the image displayed after the deceleration target is lost. As shown in the diagram on the right, the notification unit 17 may notify the driver that the preceding vehicle is lost by displaying a text "The preceding vehicle cannot be detected". Note that, the image of the preceding vehicle may be erased from the display to indicate that the driver cannot recognize the preceding vehicle.

Figure 2B:
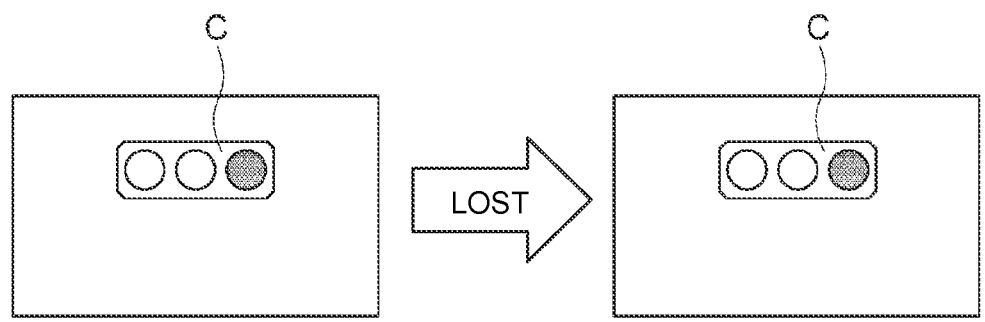
FIG. 2B includes diagrams for explaining images displayed before and after the deceleration target is lost when the deceleration target is a traffic light.

When the loss determination unit 15 determines that the deceleration target is lost, the notification unit 17 does not notify the driver that the deceleration target is lost when the type of the deceleration target is included in the category of the position-fixed object. FIG. 2B includes diagrams for explaining images displayed before and after the deceleration target is lost when the deceleration target is the traffic light. FIG. 2B shows images C of the traffic light. In FIG. 2B, the diagram on the left shows the image displayed before the deceleration target is lost, and the diagram on the right indicates the image displayed after the deceleration target is lost. As shown in FIG. 2B, the notification unit 17 does not change the displayed image before and after the traffic light is lost, and does not notify the driver.

When the lost deceleration target is the traffic light, the notification unit 17 may notify the driver that the deceleration target is lost under a predetermined condition. Specifically, when the lost deceleration target is the traffic light, the notification unit 17 determines whether a change in the lighting state of the traffic light from the lighting state at the time that the traffic light is lost causes the target vehicle speed of the deceleration assistance to be changed to a small value.

When the traffic light is lost while the deceleration assistance with the target vehicle speed for stopping the host vehicle is being performed for the traffic light in the passage prohibited state, the notification is not always required because the target vehicle speed is not changed to a small value even if the deceleration assistance for turning right or left needs to be performed to reduce the target vehicle speed due to a change in the lighting state of the traffic light. On the other hand, when the traffic light is lost while the deceleration assistance for turning right or left is being performed for the traffic light in the passage permitted state, the notification to the driver is required because the target vehicle speed needs to be changed to a small value (i.e. further deceleration is required from the current deceleration assistance) if the deceleration assistance for stopping the host vehicle needs to be performed to reduce the target vehicle speed due to a change in the lighting state of the traffic light.

When the notification unit 17 determines that a change in the lighting state of the traffic light from the lighting state at the time that the traffic light is lost causes the target vehicle speed of the deceleration assistance to be changed to a small value, the notification unit 17 notifies the driver that the traffic light is lost. The notification unit 17 prompts the driver to intervene in a driving operation by notifying the driver that the traffic light is lost because, for example, the lost traffic light may be switched from the passage permitted state to the passage prohibited state. On the other hand, when the notification unit 17 determines that the target vehicle speed of the deceleration assistance is not changed to a small value as the lighting state of the traffic light is changed from the lighting state when the traffic light is lost, the notification unit 17 does not notify the driver that the traffic light is lost.

Processing of Driver Assistance Device

Next, processing of the driver assistance device 100 according to the embodiment will be described with reference to the drawings. FIG. 3 is a flowchart showing an example of deceleration assistance start processing. The deceleration assistance start processing is performed when a driver assistance function is being performed.

As shown in FIG. 3, the driver assistance ECU 10 of the driver assistance device 100 determines whether the deceleration target is detected by the deceleration target detection unit 11 in S10. The deceleration target detection unit 11 detects the deceleration target in front of the host vehicle based on the detection result of the external sensor 1. When the driver assistance ECU 10 determines that the deceleration target is detected (S10: YES), the driver assistance ECU 10 proceeds to S12. When the driver assistance ECU 10 determines that the deceleration target is not detected (S10: NO), the driver assistance ECU 10 terminates the processing of this routine. After that, the driver assistance ECU 10 repeats the processing from S10 again after an elapse of a certain time.

In S12, the driver assistance ECU 10 determines the type of deceleration target using the type determination unit 12. The deceleration target detection unit 11 determines the type of the deceleration target by performing pattern matching using an image pattern for each type that is stored in advance, based on the image in front of the host vehicle that is captured by the camera, for example. The relative condition recognition unit 13 recognizes the relative condition between the host vehicle and the deceleration target.

In S14, the driver assistance ECU 10 determines whether the deceleration assistance start condition for the deceleration target is satisfied using the start condition determination unit 14. For example, when the type of deceleration target is the preceding vehicle, the start condition determination unit 14 determines whether the deceleration assistance start condition for the preceding vehicle is satisfied based on the relative condition between the host vehicle and the deceleration target. When the start condition determination unit 14 determines that the deceleration assistance start condition is satisfied (S14: YES), the driver assistance ECU 10 proceeds to S16. When the start condition determination unit 14 determines that the deceleration assistance start condition is not satisfied (S14: NO), the driver assistance ECU 10 terminates the processing of this routine. After that, the driver assistance ECU 10 repeats the processing from S10 again after an elapse of a certain time.

In S16, the driver assistance ECU 10 causes the driver assistance unit 16 to perform the deceleration assistance for the deceleration target. The driver assistance unit 16 performs deceleration assistance of the host vehicle by transmitting the control signal to the actuator 4.

FIG. 4 is a flowchart showing an example of determination processing of the deceleration assistance start condition when the deceleration target is the traffic light. The determination processing of the deceleration assistance start condition corresponds to S14 in FIG. 3.

As shown in FIG. 4, in S20, the driver assistance ECU 10 determines, using the start condition determination unit 14, whether the TTC of the host vehicle with respect to the position of the temporary stop line before the traffic light falls below the TTC threshold. The start condition determination unit 14 calculates the TTC of the host vehicle with respect to the position of the temporary stop line before the traffic light, based on the detection result of the external sensor 1 or the internal sensor 2 (vehicle speed sensor), for example. When the start condition determination unit 14 determines that the TTC of the host vehicle with respect to the position of the temporary stop line before the traffic light falls below the TTC threshold (S20: YES), the driver assistance ECU 10 proceeds to S22. When the driver assistance ECU 10 determines that the TTC of the host vehicle with respect to the position of the temporary stop line before the traffic light does not fall below the TTC threshold (S20: NO), the driver assistance ECU 10 terminates the processing of this routine. After that, the driver assistance ECU 10 repeats the processing from S20 again after an elapse of a certain time.

In S22, the driver assistance ECU 10 determines whether the traffic light, which is the deceleration target, is in the passage permitted state using the start condition determination unit 14. The start condition determination unit 14 recognizes the traveling direction of the traveling lane in which the host vehicle is traveling and the lighting state of the traffic light based on the detection result of the external sensor 1, and determines whether the traffic light is in the passage permitted state based on the traveling direction of the traveling lane in which the host vehicle is traveling and the lighting state of the traffic light. When the start condition determination unit 14 determines that the traffic light is not in the passage permitted state (S22: NO), the driver assistance ECU 10 proceeds to S24. When the start condition determination unit 14 determines that the traffic light is in the passage permitted state (S22: YES), the driver assistance ECU 10 proceeds to S26.

In S24, the driver assistance ECU 10 sets the target vehicle speed for stopping the host vehicle (for example, 0 km/h) as the target vehicle speed of the deceleration assistance using the driver assistance unit 16. After that, the processing of this routine is terminated and the driver assistance ECU 10 proceeds to S16 in FIG. 3.

In S26, the driver assistance ECU 10 determines whether the host vehicle turns right/left or not using the start condition determination unit 14. The start condition determination unit 14 determines whether the host vehicle turns right/left or not, for example, based on the traveling direction of the traveling lane in which the host vehicle is traveling. When the driver assistance ECU 10 determines that the host vehicle turns right or left (S26: YES), the driver assistance ECU 10 proceeds to S28. When the driver assistance ECU 10 determines that the host vehicle does not turn right or left (S26: NO), the driver assistance ECU 10 proceeds to S30.

In S28, the driver assistance ECU 10 sets the target vehicle speed for stopping the host vehicle as the target vehicle speed of the deceleration assistance using the driver assistance unit 16. After that, the processing of this routine is terminated and the driver assistance ECU 10 proceeds to S16 in FIG. 3. In S30, the driver assistance ECU 10 determines that the deceleration assistance start condition is not satisfied using the start condition determination unit 14 and thus does not perform the deceleration assistance (corresponding to NO in S14 in FIG. 3). Then, the processing of this routine is terminated.

Figure 5:
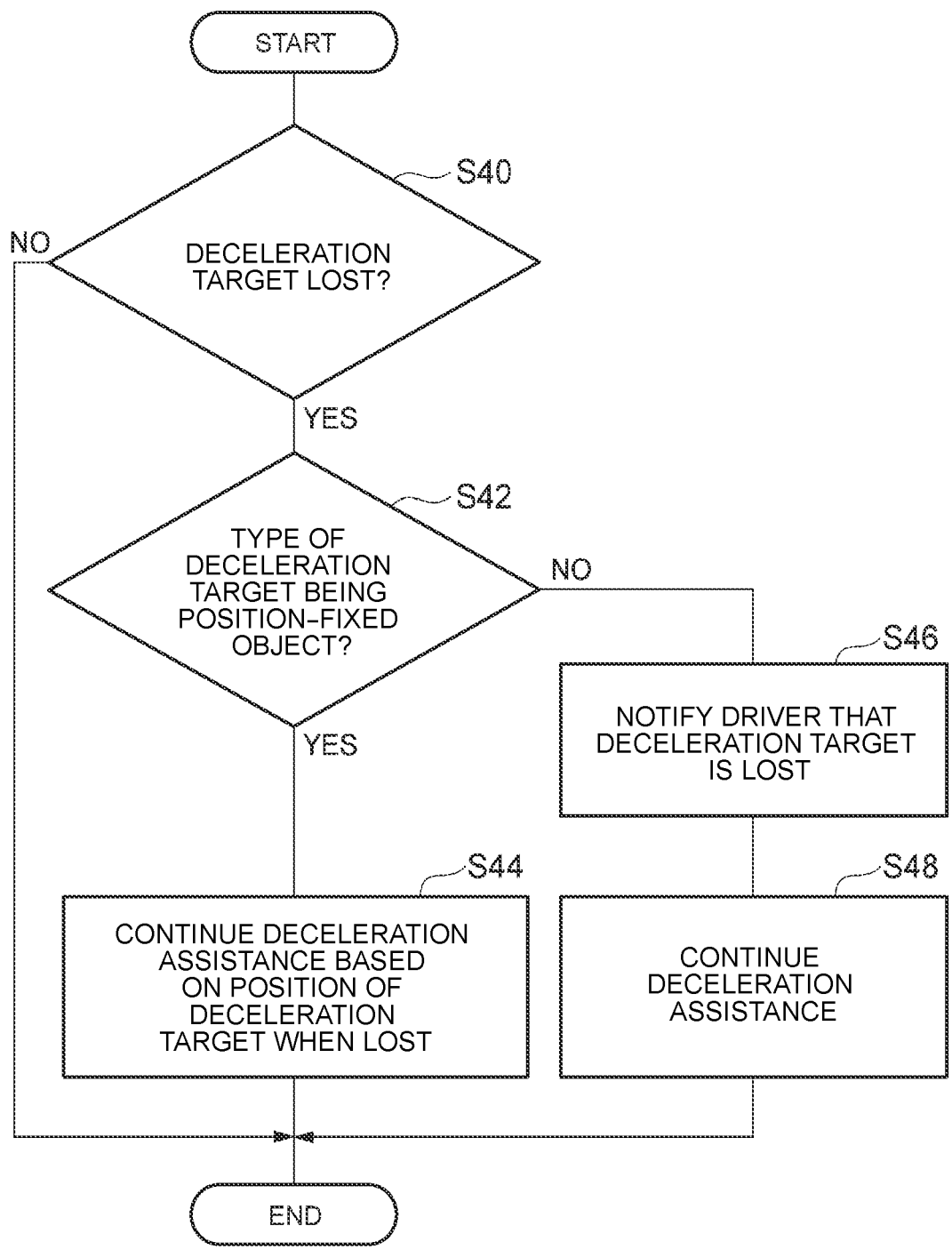
FIG. 5 is a flowchart showing an example of deceleration target loss processing.

FIG. 5 is a flowchart showing an example of deceleration target loss processing. The deceleration target loss processing shown in FIG. 5 is performed while the deceleration assistance is being performed.

As shown in FIG. 5, the driver assistance ECU 10 determines in S40 whether the deceleration target is lost using the loss determination unit 15. The loss determination unit 15 makes a loss determination based on the detection result of the external sensor 1. When the driver assistance ECU 10 determines that the deceleration target is lost (S40: YES), the driver assistance ECU 10 proceeds to S42. When the driver assistance ECU 10 determines that the deceleration target is not lost (S40: NO), the driver assistance ECU 10 terminates the processing of this routine. After that, when the deceleration assistance is continued, the driver assistance ECU 10 repeats the processing from S40 again after an elapse of a certain time.

In S42, the driver assistance ECU 10 determines whether the type of deceleration target is included in the category of the position-fixed object or the category of the moving object using the type determination unit 12. The type determination unit 12 performs the above determination by, for example, performing pattern matching using the image pattern for each type that is stored in advance based on the image in the front of the host vehicle that is captured by the camera. When the type determination unit 12 determines that the type of deceleration target is included in the category of the position-fixed object (S42: YES), the driver assistance ECU 10 proceeds to S44. When the type determination unit 12 determines that the type of deceleration target is included in the category of the moving object (S42: NO), the driver assistance ECU 10 proceeds to S46.

In S44, the driver assistance ECU 10 continues the deceleration assistance based on the position of the deceleration target when the deceleration target is lost using the driver assistance unit 16. In this case, the driver assistance ECU 10 does not notify the driver that the deceleration target is lost. When the type of deceleration target is included in the category of the position-fixed object, the position of the deceleration target with respect to the road is not changed. Therefore, the driver assistance unit 16 continues the deceleration assistance before the deceleration target is lost by recognizing the relative condition based on the effect by driving of the host vehicle using the position of the deceleration target when the deceleration target is lost. The driver assistance ECU 10 terminates the processing of this routine.

In S46, the driver assistance ECU 10 notifies the driver that the deceleration target is lost using the notification unit 17. The notification unit 17 notifies the driver that the deceleration target is lost using the image display (text display) as shown in FIG. 2A. The driver assistance ECU 10 then proceeds to S48.

In S48, the driver assistance ECU 10 continues the deceleration assistance based on the relative condition between the host vehicle and the deceleration target when the deceleration target is lost using the driver assistance unit 16. The driver assistance unit 16 continues the deceleration assistance on assumption that the deceleration target maintains the speed and the traveling direction when the deceleration target is lost. The driver assistance ECU 10 terminates the processing of this routine.

Figure 6:
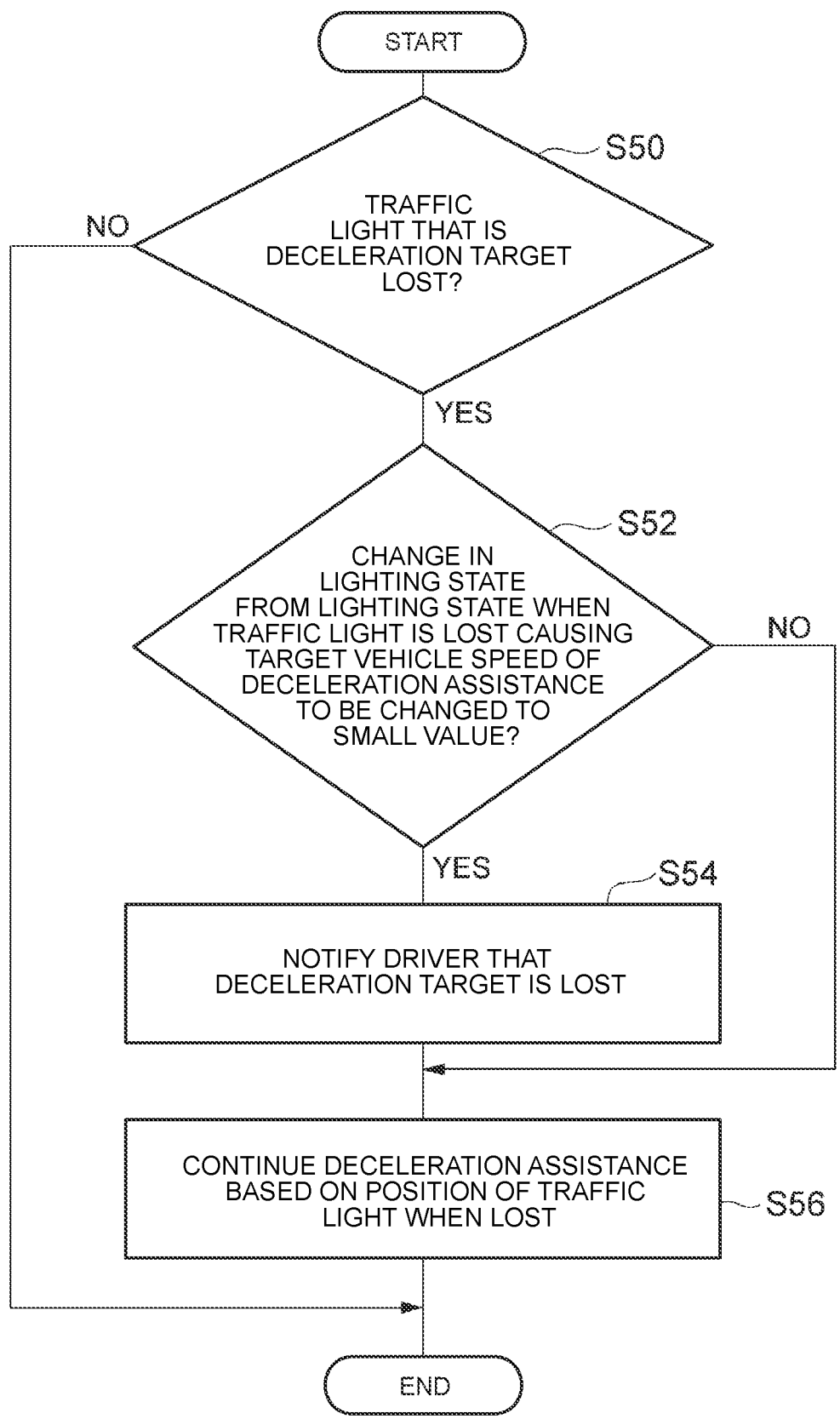
FIG. 6 is a flowchart showing an example of the deceleration target loss processing when the deceleration target is the traffic light.

FIG. 6 is a flowchart showing an example of the deceleration target loss processing when the deceleration target is the traffic light. As shown in FIG. 6, the driver assistance ECU 10 determines in S50 whether the traffic light, which is the deceleration target, is lost using the loss determination unit 15. When the loss determination unit 15 determines that the traffic light, which is the deceleration target, is lost (S50: YES), the driver assistance ECU 10 proceeds to S52. When the loss determination unit 15 determines that the traffic light, which is the deceleration target, is not lost (S50: NO), the driver assistance ECU 10 terminates the processing of this routine. After that, when the deceleration assistance is continued, the driver assistance ECU 10 repeats the processing from S50 again after an elapse of a certain time.

In S52, the driver assistance ECU 10 determines whether a change in the lighting state of the traffic light from the lighting state at the time that the traffic light is lost causes the target vehicle speed of the deceleration assistance to be changed to a small value by using the notification unit 17. When the traffic light in the passage permitted state is lost in the case where the target vehicle speed of the deceleration assistance for the traffic light in the passage prohibited state is smaller than the target vehicle speed of the deceleration assistance for the traffic light in the passage permitted state, for example, the notification unit 17 determines that the target vehicle speed of the deceleration assistance is changed to a small value as the lighting state of the traffic light is changed from the lighting state when the traffic light is lost. When the notification unit 17 determines that the target vehicle speed of the deceleration assistance is changed to a small value as the lighting state of the traffic light is changed from the lighting state when the traffic light is lost (S52: YES), the driver assistance ECU 10 proceeds to S54. When the notification unit 17 determines that the target vehicle speed of the deceleration assistance is not changed to a small value as the lighting state of the traffic light is changed from the lighting state when the traffic light is lost (S52: NO), the driver assistance ECU 10 proceeds to S56.

In S54, the driver assistance ECU 10 notifies the driver that the deceleration target (traffic light) is lost using the notification unit 17. The notification unit 17 notifies the driver that the traffic light is lost using the image display (text display), for example. The driver assistance ECU 10 then proceeds to S56.

In S56, the driver assistance ECU 10 continues the deceleration assistance based on the position of the traffic light when the traffic light is lost using the driver assistance unit 16. The processing above may be similar to the processing in S44 described above. The driver assistance ECU 10 terminates the processing of this routine.

With the driver assistance device 100 according to the embodiment described above, when the deceleration target is lost while the deceleration assistance is being performed and the type of deceleration target is included in the category of the moving object, the driver of the host vehicle is notified that the deceleration target is lost. Therefore, the driver can be notified that the deceleration target is lost under the condition that it becomes difficult to appropriately continue the deceleration assistance with the deceleration target being lost. On the other hand, with the driver assistance device 100, when the type of the lost deceleration target is included in the category of the position-fixed object, the driver is not notified that the deceleration target is lost. Therefore, under the condition that it is not much necessary to cause the driver to intervene the driving operation and it is highly likely to recognize the deceleration target again promptly, issuance of unnecessary notification to the driver can be avoided, which can suppress causing the driver to feel annoyed by the notification that the deceleration target is lost.

Further, with the driver assistance device 100, when the type of deceleration target is included in the category of the position-fixed object, the position of the lost deceleration target is not changed. Therefore, appropriate deceleration assistance can be continued using the position of the deceleration target when the deceleration target is lost. Further, with the driver assistance device 100, when the target vehicle speed of the deceleration assistance is changed to a small value due to a change in the lighting state of the traffic light, which is the deceleration target, after the traffic light is lost, there is a possibility that the host vehicle may need further deceleration from the current deceleration assistance due to the change in the lighting state of the traffic light. Accordingly, by notifying the driver that the traffic light is lost, the driver can be prompted to perform a deceleration operation of the host vehicle at the driver's discretion.

Although the embodiment of the disclosure has been described above, the disclosure is not limited to the embodiment above. The disclosure can be implemented in various modes including various modifications and improvements based on the knowledge of those skilled in the art, including the embodiment as described above.

For example, the start condition determination unit 14 does not necessarily need to perform recognition of the traveling direction of the traveling lane in which the host vehicle is traveling when the deceleration target is the traffic light. The start condition determination unit 14 may determine whether the traffic light is in the passage permitted state only based on the lighting state of the traffic light, regardless of the traveling direction of the traveling lane in which the host vehicle is traveling. The passage permitted state in this case means that the traffic light is green.

In addition, the start condition determination unit 14 does not necessarily have to determine whether the vehicle is turning right/left or not. The start condition determination unit 14 may uniformly determine that the deceleration assistance start condition is not satisfied when the traffic light is in the passage permitted state.

Alternatively, the start condition determination unit 14 may determine that the deceleration assistance start condition is satisfied when other conditions such as TTC are satisfied, regardless of the lighting state of the traffic light. That is, the driver assistance unit 16 may perform the deceleration assistance not only when the host vehicle turns right or left but also when the host vehicle travels straight with the traffic light being in the passage permitted state. For example, in the case where the host vehicle travels straight with the traffic light being in the passage permitted state, the driver assistance unit 16 performs the deceleration assistance such that the speed of the host vehicle drops to or falls below a target vehicle speed for traveling straight when the speed of the host vehicle exceeds a preset target vehicle speed for traveling straight. The target vehicle speed for traveling straight is not particularly limited, but may be set to a value higher than the target vehicle speed for turning left or right (for example, 50 km/h). In addition, when the traffic light, which is the deceleration target, is lost, the notification unit 17 may not necessarily notify the driver that the traffic light is lost all the time.

What is claimed is:

1. A driver assistance device configured to perform, when a deceleration target is detected in front of a host vehicle, deceleration assistance of the host vehicle for the deceleration target, the driver assistance device comprising:
a type determination unit configured to determine whether a type of the deceleration target is included in a category of a position-fixed object or a category of a moving object;
a loss determination unit configured to determine whether the deceleration target is lost while the deceleration assistance is being performed;
a driver assistance unit configured to continue the deceleration assistance on assumption that the lost deceleration target exists when the loss determination unit determines that the deceleration target is lost; and
a notification unit configured to
notify a driver of the host vehicle that the deceleration target is lost, when the loss determination unit determines that the deceleration target is lost and the type of the deceleration target is included in the category of the moving object, and
not notify the driver, that the deceleration target is lost, when the loss determination unit determines that the deceleration target is lost and the type of the deceleration target is included in the category of the position-fixed object.

2. The driver assistance device according to claim 1, wherein:
the driver assistance unit is configured to continue the deceleration assistance by using a position of the deceleration target, when the loss determination unit determines that the deceleration target is lost and the type of the deceleration target is included in the category of the position-fixed object; and
the position of the deceleration target is a position when the deceleration target is lost.

3. The driver assistance device according to claim 1, wherein:
the type determination unit is configured to determine whether the deceleration target is a traffic light and determine a lighting state of the traffic light when the deceleration target is the traffic light; and
the notification unit is configured to
determine whether a target vehicle speed of the deceleration assistance is changed to a small value by the lighting state of the traffic light changed from the lighting state at time that the traffic light is lost, when the type determination unit determines that the deceleration target is the traffic light and the loss determination unit determines that the traffic light is lost,
notify the driver that the traffic light is lost, when the change in the lighting state of the traffic light causes the target vehicle speed of the deceleration assistance to be changed to a small value, and
not notify the driver that the traffic light is lost, when the change in the lighting state of the traffic light does not cause the target vehicle speed of the deceleration assistance to be changed to a small value.

4. A driver assistance device comprising an electronic control unit configured to:
perform, when a deceleration target is detected in front of a host vehicle, a deceleration assistance of the host vehicle for the deceleration target;
determine whether a type of the deceleration target is included in a category of a position-fixed object or a category of a moving object;
determine whether the deceleration target is lost while the deceleration assistance is being performed;
continue the deceleration assistance on assumption that the lost deceleration target exists when the deceleration target is determined to be lost;
notify a driver of the host vehicle that the deceleration target is lost, when the deceleration target is determined to be lost and the type of the deceleration target is included in the category of the moving object; and
not notify the driver that the deceleration target is lost, when the deceleration target is determined to be lost and the type of the deceleration target is included in the category of the position-fixed object.

5. The driver assistance device according to claim 4, wherein:
the electronic control unit is configured to continue the deceleration assistance by using a position of the deceleration target, when the deceleration target is determined to be lost and the type of the deceleration target is included in the category of the position-fixed object; and
the position of the deceleration target is a position when the deceleration target is lost.

6. The driver assistance device according to claim 4, wherein the electronic control unit is configured to:
determine whether the deceleration target is a traffic light and determine a lighting state of the traffic light when the deceleration target is the traffic light;
determine whether a target vehicle speed of the deceleration assistance is changed to a small value by the lighting state of the traffic light changed from the lighting state at time that the traffic light is lost, when the deceleration target is determined to be the traffic light and the traffic light is determined to be lost;
notify the driver that the traffic light is lost, when the change in the lighting state of the traffic light causes the target vehicle speed of the deceleration assistance to be changed to a small value; and
not notify the driver that the traffic light is lost, when the change in the lighting state of the traffic light does not cause the target vehicle speed of the deceleration assistance to be changed to a small value.

* * * * *